United States Patent
Albouyeh et al.

(10) Patent No.: US 10,210,274 B2
(45) Date of Patent: Feb. 19, 2019

(54) METHOD, SYSTEM AND COMPUTER PRODUCT FOR FILTERING AUDIENCE VIEWING OF URL DATA UTILIZING HASHTAGS

(71) Applicant: International Business Machines Corporation, Armonk, NY (US)

(72) Inventors: Shadi E. Albouyeh, Raleigh, NC (US); James E. Fox, Apex, NC (US); Trudy L. Hewitt, Cary, NC (US); Prasad L. Imandi, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/986,882

(22) Filed: Jan. 4, 2016

(65) Prior Publication Data
US 2017/0193126 A1  Jul. 6, 2017

(51) Int. Cl.
*G06F 17/30* (2006.01)
*G06F 21/62* (2013.01)
(Continued)

(52) U.S. Cl.
CPC .. *G06F 17/30887* (2013.01); *G06F 17/30516* (2013.01); *G06F 17/30525* (2013.01);
(Continued)

(58) Field of Classification Search
None
See application file for complete search history.

(56) References Cited

U.S. PATENT DOCUMENTS 8,176,079 B1 * 5/2012 Spertus ............ G06F 17/30867
707/785
9,077,677 B2   7/2015 Mackin
(Continued)

FOREIGN PATENT DOCUMENTS

WO    WO 0209430 A2 *  1/2002  ............. H04N 7/165

OTHER PUBLICATIONS

A. Shapp, "Variation in the use of Twitter hashtags," http://www.nyu.edu/projects/shapp/Shapp_QP2_Hashtags_Final.pdf, Spring 2014, 44 pages.
(Continued)

*Primary Examiner* — Amresh Singh
(74) *Attorney, Agent, or Firm* — Cantor Colburn LLP

(57) ABSTRACT

A computer implemented method for filtering audience viewing of uniform resource locator (URL) data utilizing hashtags including: identifying a hashtag input by a first user; identifying at least one user preference of the first user, the at least one user preference related to data sharing preferences of the first user on an electronic platform; generating a uniform resource locator (URL) based on the identified hashtag and the identified at least one user preference of the first user; and using the URL, filtering data communication on the electronic platform, thereby displaying a privatized stream of data when the first user accesses the identified hashtag, the privatized stream of data accessible by a second user, the second user being authorized to view the privatized stream of data based on the data sharing preferences of the first user.

6 Claims, 5 Drawing Sheets

(51) Int. Cl.
  *G06Q 30/02* (2012.01)
  *H04L 12/58* (2006.01)
  *H04L 29/08* (2006.01)
  *G06F 21/33* (2013.01)

(52) U.S. Cl.
  CPC .. *G06F 17/30528* (2013.01); *G06F 17/30867* (2013.01); *G06F 21/335* (2013.01); *G06F 21/6218* (2013.01); *G06Q 30/0201* (2013.01); *H04L 51/32* (2013.01); *H04L 67/306* (2013.01); *H04L 51/12* (2013.01)

(56) References Cited

U.S. PATENT DOCUMENTS

| | | |
|---|---|---|
| 9,094,282 B2 | 7/2015 | Richardson et al. |
| 9,129,025 B2 | 9/2015 | Perry et al. |
| 2010/0185630 A1* | 7/2010 | Cheng ............... G06F 17/30867 707/756 |
| 2012/0066312 A1 | 3/2012 | Kandekar et al. |
| 2012/0110458 A1* | 5/2012 | Brown .............. G06F 17/30731 715/733 |
| 2014/0289518 A1 | 9/2014 | Sinha |
| 2014/0337695 A1 | 11/2014 | Chakra et al. |
| 2015/0150147 A1* | 5/2015 | Keohane ............ G06F 21/6209 726/28 |
| 2016/0117063 A1* | 4/2016 | Fuller .................. G06F 3/0482 715/739 |

OTHER PUBLICATIONS

Socialbakers Staff Writer, "Everything you need to know about #Hastags on Facebook," http://www.socialbakers.com/blog/1826-everything-you-need-to-know-about-hashtags-on-facebook, Jun. 13, 2013, 9 pages.

* cited by examiner

METHOD, SYSTEM AND COMPUTER PRODUCT FOR FILTERING AUDIENCE VIEWING OF URL DATA UTILIZING HASHTAGS

BACKGROUND

The present invention relates to hyperlinking of hashtags to uniform resource locators (URLs), and more specifically, to methods, systems and computer products for filtering audience viewing of URL data utilizing hashtags.

Current usage of hashtags allows users to search for or to post content associated with such a hashtag, which may be linked to a URL, for example the public website of a business. Thus, users may provide data along with a hashtag in order to associate data with that hashtag, and by extension with the linked website. In a social media context, the hashtag may be utilized to post messages or other content relative to that hashtag.

However, such usage can be problematic where a particular hashtag is heavily used by a large number of users. Problems include, among others, the inevitable mixing of content from plural unrelated users utilizing unrelated content, which is compounded where widespread use of the hashtag produces a massive influx of data relative to the hashtag such that it is difficult to find or follow specific content.

While there are benefits to use of such hashtags associated with user data, there is room for improvement with regard to methods, systems and computer products utilizing hashtags.

SUMMARY

According to embodiments of the present invention, a computer implemented method for filtering audience viewing of uniform resource locator (URL) data utilizing hashtags includes: identifying a hashtag input by a first user; identifying at least one user preference of the first user, the at least one user preference related to data sharing preferences of the first user on an electronic platform; generating a uniform resource locator (URL) based on the identified hashtag and the identified at least one user preference of the first user; and using the URL, filtering data communication on the electronic platform, thereby displaying a privatized stream of data when the first user accesses the identified hashtag, the privatized stream of data accessible by a second user, the second user being authorized to view the privatized stream of data based on the data sharing preferences of the first user.

According to another embodiment of the present invention, a system for filtering audience viewing of uniform resource locator (URL) data utilizing hashtags includes a server component of an electronic platform, the server component configured to: identify a hashtag input by a first user; identify at least one user preference of the first user, the at least one user preference related to data sharing preferences of the first user on an electronic platform; generate a uniform resource locator (URL) based on the identified hashtag and the identified at least one user preference of the first user; and using the URL, filter data communication on the electronic platform, thereby displaying a privatized stream of data when the first user accesses the identified hashtag, the privatized stream of data accessible by a second user, the second user being authorized to view the privatized stream of data based on the data sharing preferences of the first user.

According to another embodiment of the present invention, a computer program product including a computer readable medium containing computer executable code thereon, wherein the computer executable code, when processed by a processor of a computer, directs the processor to perform a method of filtering audience viewing of URL data utilizing hashtags, includes: identifying a hashtag input by a first user; identifying at least one user preference of the first user, the at least one user preference related to data sharing preferences of the first user on an electronic platform; generating a uniform resource locator (URL) based on the identified hashtag and the identified at least one user preference of the first user; and using the URL, filtering data communication on the electronic platform, thereby displaying a privatized stream of data when the first user accesses the identified hashtag, the privatized stream of data accessible by a second user, the second user being authorized to view the privatized stream of data based on the data sharing preferences of the first user.

Additional features and advantages are realized through the techniques of the present invention. Other embodiments and aspects of the invention are described in detail herein and are considered a part of the claimed invention. For a better understanding of the invention with the advantages and features, refer to the description and the drawings.

DETAILED DESCRIPTION

Figure 1:
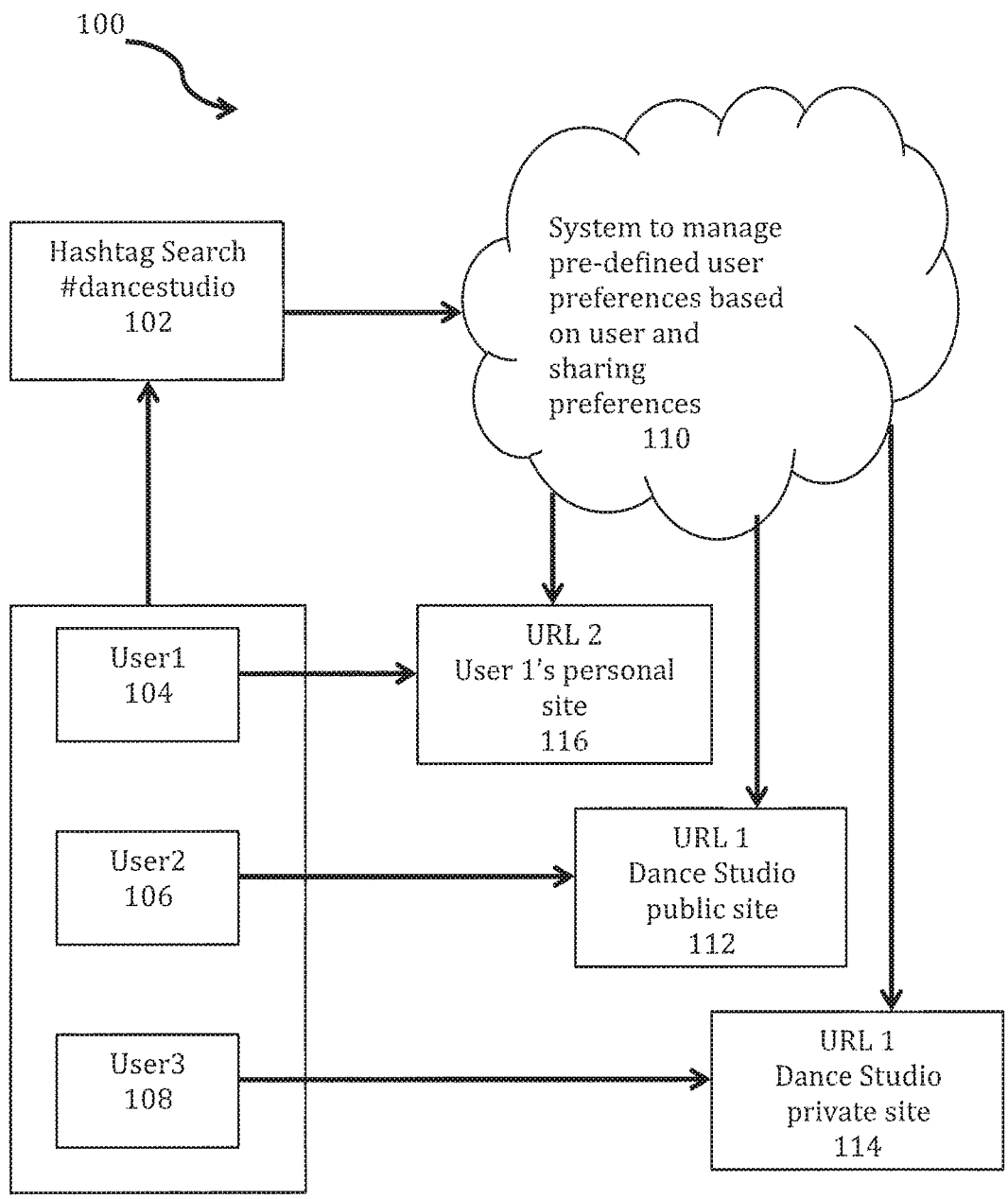
FIG. 1 is an exemplary system diagram for filtering audience viewing of URL data utilizing hashtags, in accordance with examples herein.

Embodiments herein are directed to methods, systems and computer products for. Exemplary descriptions of methods of immediately follow.

Further to the brief description provided above and associated textual detail of each of the figures, the following description provides additional details of example embodiments of the present invention.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to an embodiment of the present invention, a computer implemented method for filtering audience viewing of uniform resource locator (URL) data utilizing hashtags includes: identifying a hashtag input by a first user; identifying at least one user preference of the first user, the at least one user preference related to data sharing preferences of the first user on an electronic platform; generating a uniform resource locator (URL) based on the identified hashtag and the identified at least one user preference of the first user; and using the URL, filtering data communication on the electronic platform, thereby displaying a privatized stream of data when the first user accesses the identified hashtag, the privatized stream of data accessible by a second user, the second user being authorized to view the privatized stream of data based on the data sharing preferences of the first user.

Referring now to FIG. 1, an exemplary system diagram for filtering audience viewing of URL data utilizing hashtags is shown generally at 100. In exemplary embodiments, a hashtag input by a user is identified at 102. The hashtag may be identified by any mechanism. In FIG. 1, identification 102 is provided by a hashtag search of an exemplary hashtag "#dancestudio", which, in this example, is a particular dance studio having an accessible website.

Plural users are identified in FIG. 1, with first, second and third users identified at 104, 106 and 108, respectively. In this example, User1 wishes to share data, e.g., a message, related to a non-public event, utilizing the dance studio's "#dancestudio" hashtag to create a private link with details of the non-public event being shared with a restricted group of users. In the example of FIG. 1, User2 106 does not have access to the non-public shared data, whereas User3 108 does have access to the private data.

Referring again to FIG. 1, a practical example relates to User1's desired use of her daughter's dance studio hashtag in order to share a message regarding a closed dance recital practice with a particular group of users via a broadcast on a social network. Exemplary embodiments, as in FIG. 1, provide a mechanism for User1's use of an otherwise public hashtag in order to create a private link with details of the closed practice that is shared with a particular group of people, e.g., friends, those attending the closed practice, friends of friends, etc., while still allowing other users to use the hashtag as a public link to, e.g., the dance studio's home page with general information about the dance studio.

Referring to the exemplary system diagram of FIG. 1, the hashtag "#dancestudio" identified as being input by User2 106 is processed by system 110 to determine that User2 106 does not have access to the non-public shared data. Accordingly, User2 106 is directed to a URL 1 Dance Studio public site 112. By contrast the same hashtag "#dancestudio" identified as being input by User3 108 is processed by system 110 to determine that User3 108 does have access to the private data and directs User3 108 to a URL 1 Dance Studio private site 114.

In exemplary embodiments, as in FIG. 1, User1 104 initially utilizes hashtag #dancestudio along with further data input (e.g., a message, etc.). In this example, the hashtag #dancestudio is associated with URL 1 Dance Studio public site 112. Based upon User1 104 preferences, system 110 generates URL 1 Dance Studio private site 114, which is hyperlinked to the hashtag #dancestudio. The system 110 may use pre-defined preferences of User1 104 from User1's personal site 116 or from other sources related to User1, for example system account, history, geographic, demographic, social connection, etc., data stored by system 110 or identified at another source, e.g., a service provider, along with the hashtag, in order to generate a private URL that is linked to the hashtag. The exemplary system may then identify subsequent users with access to the private URL based upon identification of such subsequent users' entry of the hashtag and automatically direct such subsequent users to the appropriate URL site. In additional exemplary embodiments, system 110 may also push content with select users based upon identification of users having access to the private content.

In exemplary embodiments, information in hashtags may be used to filter the audience viewing of content by having plural URLs that are hidden to the end user (as with the Dance studio public site and generated private site identified above). In such a way, the hashtag may be considered as being similar to a hyperlink with embedded security context that allows for customized distribution for privacy through use of one or a plurality of private URLs that have a limited or defined audience based on a parameter, e.g., social connection, user preferences, interests, subscriptions, etc. Additionally, such exemplary uses enable users to use any desired hashtag or hashtags for linking of communications, posts, or any content without risk of mixing undesired content, e.g., content from other users that is not related or connected.

In further exemplary embodiments, the system 110 may identify an entered hashtag from a first user and utilize additional intelligence to define or refine who the hashtag content is shared with based at least in part upon the context or content of the message. With regard to context, examples of such data include a targeted work audience or address, friends, etc. With regard to content, in exemplary embodiments, the intelligence may identify target groups associated with such content, dynamically filter content, etc.

In another exemplary embodiment, an intelligent system 110 component identifies display of filtered or limited content. In additional embodiments, a feature such as a user on/off switch may be presented to a user in order to permit that user to change from a private hashtag URL to a public hashtag URL or to a mashup thereof.

Figure 2:
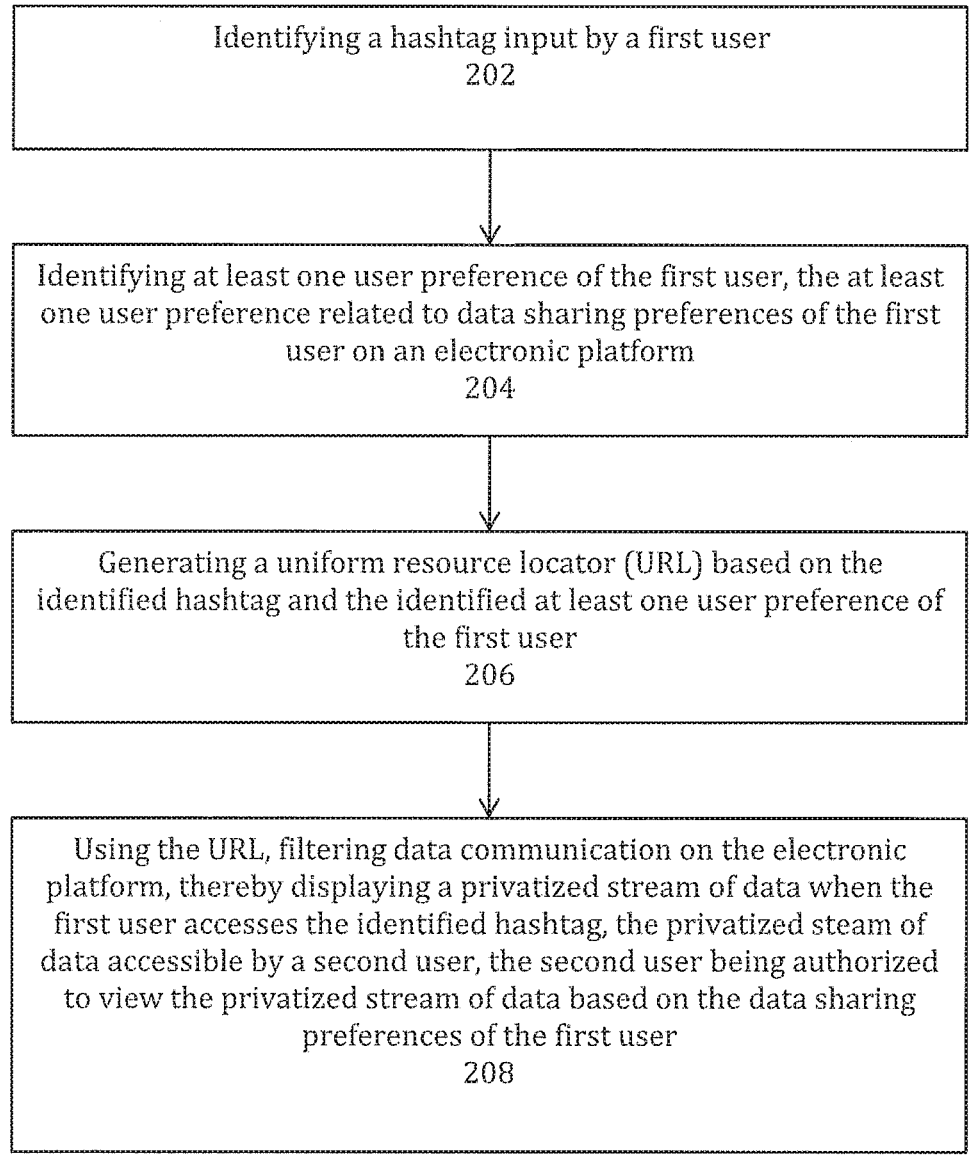
FIG. 2 is a flow chart of an exemplary method for filtering audience viewing of uniform resource locator (URL) data utilizing hashtags, in accordance with examples herein.

Referring now to FIG. 2, in exemplary embodiments, a method, shown generally at 200, for filtering audience viewing of uniform resource locator (URL) data utilizing hashtags includes: identifying a hashtag input by a first user (step 202); identifying at least one user preference of the first user, the at least one user preference related to data sharing preferences of the first user on an electronic platform (step 204); generating a uniform resource locator (URL) based on the identified hashtag and the identified at least one user preference of the first user (step 206); and using the URL, filtering data communication on the electronic platform, thereby displaying a privatized stream of data when the first user accesses the identified hashtag, the privatized stream of data accessible by a second user, the second user being authorized to view the privatized stream of data based on the data sharing preferences of the first user (step 208).

Figure 3:
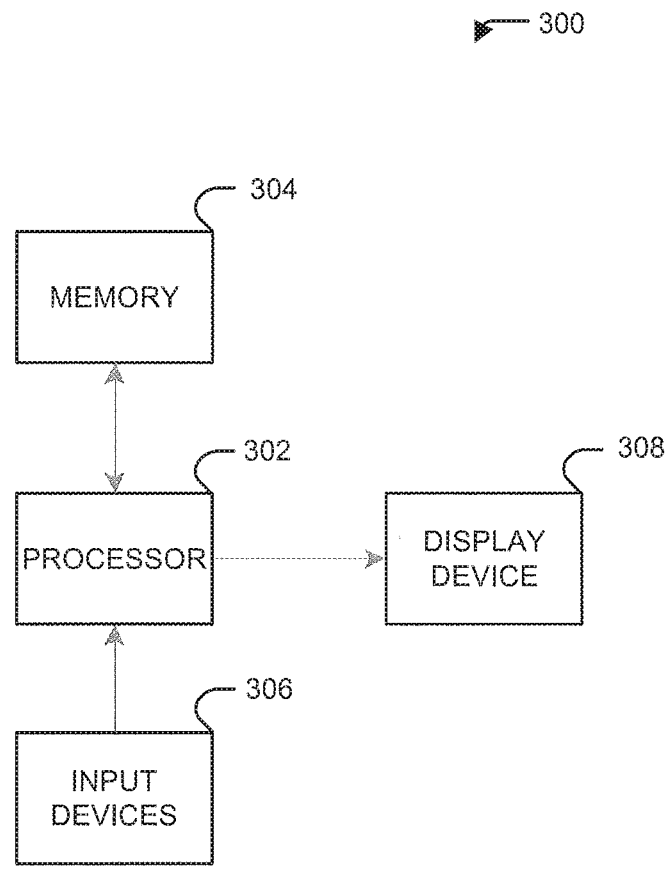
FIG. 3 is an exemplary computer apparatus, in accordance with examples herein.

Furthermore, according to an example embodiment, the methodologies described hereinbefore may be implemented by a computer system or apparatus. For example, FIG. 3 illustrates a computer apparatus 300, according to an exemplary embodiment. Therefore, portions or the entirety of the methodologies described herein may be executed as instructions in a processor 302 of the computer system 300. The computer system 300 includes memory 304 for storage of instructions and information, input device(s) 306 for computer communication, and display device(s) 308. Thus, the present invention may be implemented, in software, for example, as any suitable computer program on a computer system somewhat similar to computer system 300.

Figure 4:
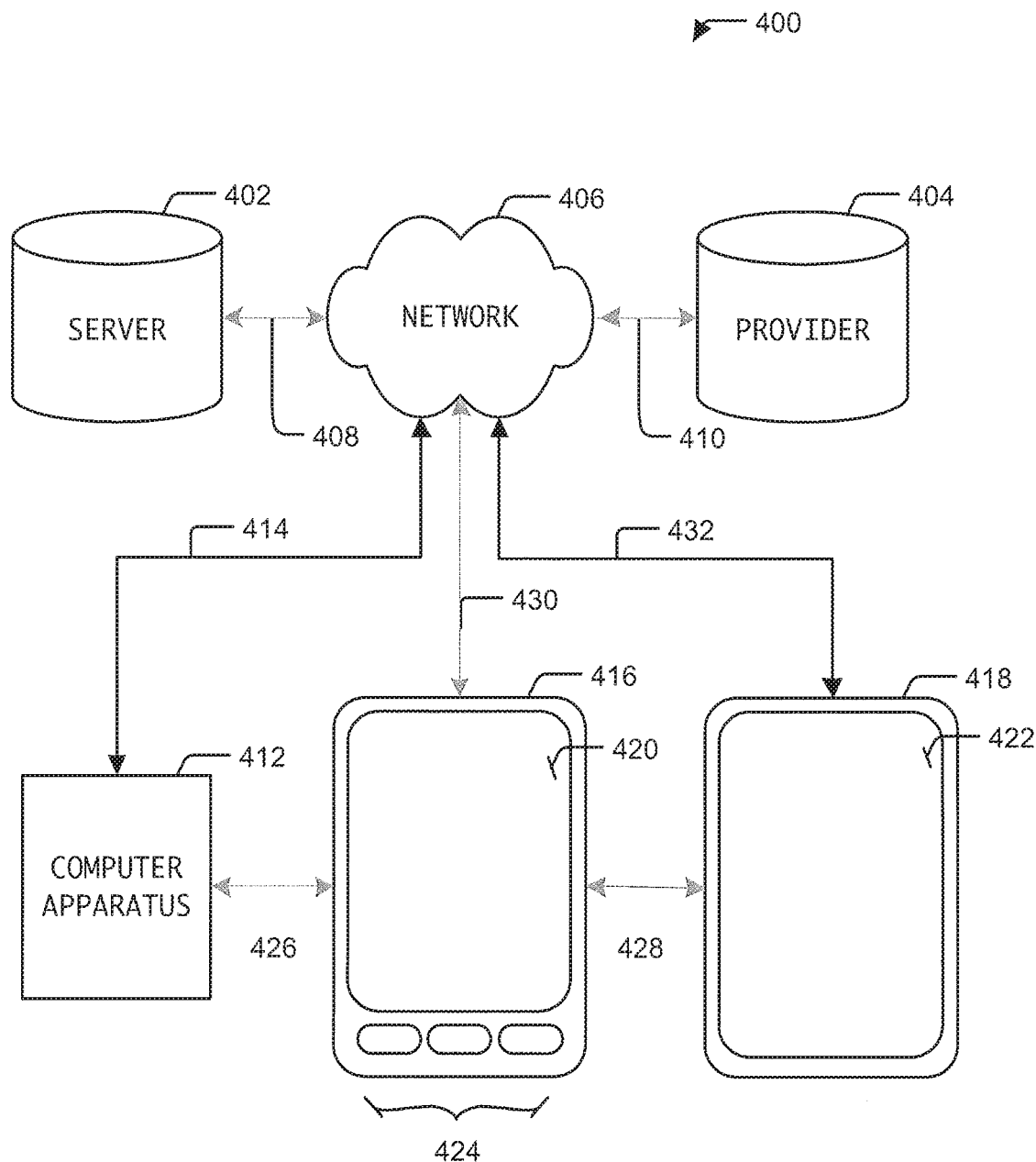
FIG. 4 is an exemplary computer system for filtering audience viewing of uniform resource locator (URL) data utilizing hashtags, in accordance with examples herein.

FIG. 4 is an example system for filtering audience viewing of uniform resource locator (URL) data utilizing hashtags, according to an example embodiment. The system 400 may include a server 402. The server 402 may include a plurality of information, including but not limited to, data, computer executable code, or any other suitable information.

The system 400 may also include a service provider 404 in communication with the server 402 over a network 406. It is noted that although illustrated as separate, the service provider 404 may include a server substantially similar to server 402. The service provider may be a data service provider, for example, a cellular service provider, an informational database, account information or address related information, a positioning service provider (satellite information, WiFi network position information, etc.), or any other suitable provider. The service provider 404 may also be an application server providing applications and/or computer executable code implementing any of the interfaces/methodologies described herein. The service provider 404 may present a plurality of application defaults, choices, set-ups, and/or configurations such that a device may receive and process the application accordingly. The service provider 404 (or indeed, the server 402) may present any application (such as a mobile application, as has been described herein) on a user interface, web-browser of a device for relatively easy selection by a user of the device. The user interface or web-page rendered for application selection may be in the form of an application store and/or application marketplace.

The network 406 may be any suitable network, including the Internet, wide area network, mobile network, and/or a local network. The server 402 and the service provider 404 may be in communication with the network 406 over communication channels 408, 410. The communication channels 408, 410 may be any suitable communication channels including wireless, satellite, cellular, wired, or otherwise.

The system 400 further includes computer apparatus 412 (see also computer system 300 in FIG. 3) in communication with the network 406, over communication channel 414. The computer apparatus 412 may be any suitable computer apparatus including a personal computer (fixed location), a laptop or portable computer, a personal digital assistant, a cellular telephone, a portable tablet computer, or otherwise. For example, the system 400 may include computer apparatuses 416 and 418, which in this example are embodied as a smartphone and a wireless device such as a tablet, respectively. The apparatuses 416 and 418 may include display means 420, 422, and/or buttons/controls 424. The controls 424 may operate independently or in combination with any of the controls noted above. For example, the controls 424 may be controls directed to cellular operation or other wireless operations.

Further, the apparatuses 412, 416, and 418 may be in communication with each other over communication channels 426, 428 (for example, wired, wireless, Bluetooth channels, etc.); and may further be in communication with the network 406 over communication channels 414, 430, and 432.

Therefore, the apparatuses 412, 416, and 418 may all be in communication with one or both of the server 402 and the service provider 404, as well as each other. Each of the apparatuses may be in severable communication with the network 406 and each other, such that the apparatuses 412, 416, and 418 may be operated without constant communication with the network 406 (e.g., using data connection controls of an interface). For example, if there is no data availability or if a user directs an apparatus to work offline, an application, e.g., at any of the apparatuses 412, 416, and 418 may be based on stored information/parameters, with subsequent application processing once network connectivity has been reestablished. It follows that each of the apparatuses 412, 416, and 418 may be configured to perform the methodologies described above.

An exemplary system includes multiple components, including; a server in communication with the application to provide additional information and to facilitate filtering of audience viewing of uniform resource locator (URL) data utilizing hashtags, as has been described herein; and hardware, such as system 110 and other servers and computer apparatuses, as has also been described herein.

In exemplary embodiments, the application may be configured to interface with system 110, which may operate on or as a part of a service provider, social media platform or other online system. Such application implementations may allow, with or without server and associated database resources, to provide server, or other aspects described herein.

Figure 5:
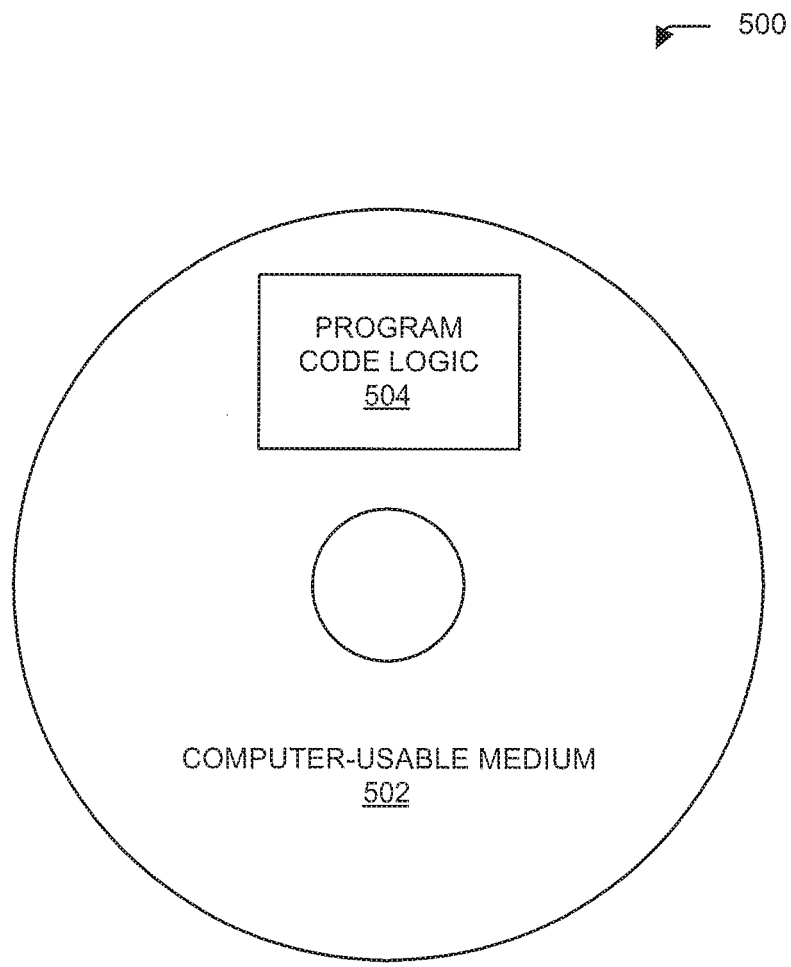
FIG. 5 is an exemplary computer-usable medium for filtering audience viewing of uniform resource locator (URL) data utilizing hashtags, in accordance with examples herein.

A program in accordance with the present invention may be a computer program product causing a computer to execute the example methods described herein. Thus, example embodiments may include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor (e.g., 302), the computer program code logic 504 segments configure the microprocessor to create specific logic circuits.

The computer-readable storage medium may be a built-in medium installed inside a computer main body or removable medium arranged so that it can be separated from the computer main body.

Further, such programs, when recorded on computer-readable storage media, may be readily stored and distributed. The storage medium, as it is read by a computer, may enable the method(s) disclosed herein, in accordance with an exemplary embodiment of the present invention.

Therefore, the methodologies and systems of example embodiments of the present invention can be implemented in hardware, software, firmware, or a combination thereof. Embodiments may be implemented in software or firmware that is stored in a memory and that is executed by a suitable instruction execution system. These systems may include any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of at least one example embodiment of the present invention in which functions may be executed out of order from that shown or discussed, including substantially concurrently or in reverse order, depending on the functionality involved, as would be understood by those reasonably skilled in the art of the present invention.

Any program which would implement functions or acts noted in the figures, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for filtering audience viewing of URL data utilizing hashtags, comprising:
    identifying, by a processor, a hashtag inputted by a first user;
    identifying at least one user preference of the first user, the at least one user preference related to data sharing preferences of the first user on an electronic platform;
    identifying a content of the identified hashtag, wherein the content specifies data sharing preferences of the first user;
    embedding a uniform resource locator (URL) in the identified hashtag, wherein the URL points to two or more separate resources according to the identified at least one user preference of the first user and the content of the identified hashtag, wherein the two or more separate resources comprise at least one of a private site accessible by said second user according to the identified at least one user preference of the first user;
    providing one of the two or more resources when receiving an indication of a request to access the identified hashtag by a second user based upon a comparison of a characteristic of the second user to the at least one user preference of the first user and the content of the identified hashtag;
    responsive to receiving the indication of the request to access the identified hashtag by the second user, directing the second user to a target network for sharing the identified hashtag based on the content of the identified hashtag;
    displaying at a user interface an indication as to whether results of an identified hashtag search are being filtered to provide one of the two or more separate resources; and
    providing at the user interface a control to perform switching between the two or more separate resources and displaying a mashup of the two or more separate resources.

2. A method in accordance with claim 1, wherein said user preference includes one or more of: a friends list; an interest of the first user; and a subscription of the first user.

3. A system for filtering audience viewing of uniform resource locator (URL) data utilizing hashtags, comprising:
a processor coupled to a memory, the processor configured to:
identify a hashtag inputted by a first user;
identify at least one user preference of the first user, the at least one user preference related to data sharing preferences of the first user on an electronic platform;
identify a content of the identified hashtag, wherein the content specifies data sharing preferences of the first user
embed a uniform resource locator (URL) in the identified hashtag, wherein the URL points to two or more resources according to the identified at least one user preference of the first user and the content of the identified hashtag, wherein the two or more separate resources comprise at least one of a private site accessible by said second user according to the identified at least one user preference of the first user;
provide one of the two or more resources when receiving an indication of a request to access the identification hashtag by a second user based upon a comparison of a characteristic of the second user to the at least one user preference of the first user and the content of the identified hashtag;
responsive to receiving the indication of the request to access the identified hashtag by the second user, directing the second user to a target network for sharing the identified hashtag based on the content of the identified hashtag;
display at a user interface an indication as to whether results of an identified hashtag search are being filtered to provide one of the two or more separate resources; and
provide at the user interface a control to perform switching between the two or more separate resources and displaying a mashup of the two or more separate resources.

4. A system in accordance with claim 3, wherein said user preference includes one or more of: a friends list; an interest of the first user; and a subscription of the first user.

5. A system in accordance with claim 3, further comprising a user application configured to accept user input of user hashtag information to redirect to and display data for one of the two or more separate resources.

6. A computer program product for filtering audience viewing of URL data utilizing hashtags, the computer program product comprising a computer readable storage medium having program instructions embodied therewith, wherein the computer readable storage medium is not a transitory signal per se, the program instructions executable by a processor to cause the processor to perform a method comprising:
identifying, by the processor, a hashtag inputted by a first user;
identifying at least one user preference of the first user, the at least one user preference related to data sharing preferences of the first user on an electronic platform;
identifying a content of the identified hashtag, wherein the content specifies data sharing preferences of the first user;
embedding a uniform resource locator (URL) in the identified hashtag, wherein the URL points to two or more separate resources according to the identified at least one user preference of the first user and the content of the identified hashtag, wherein the two or more separate resources comprise at least one of a private site accessible by said second user according to the identified at least one user preference of the first user;
providing one of the two or more resources when receiving an indication of a request to access the identified hashtag by a second user based upon a comparison of a characteristic of the second user to the at least one user preference of the first user and the content of the identified hashtag;
responsive to receiving an indication of the request to access the identified hashtag by the second user, directing the second user to a target network for sharing the identified hashtag based on the content of the identified hashtag;
displaying at a user interface an indication as to whether results of an identified hashtag search are being filtered to provide one of the two or more separate resources; and
providing at the user interface a control to perform switching between the two or more separate resources and displaying a mashup of the two or more separate resources.

* * * * *